United States Patent [19]

Black et al.

[11] Patent Number: 5,724,731
[45] Date of Patent: Mar. 10, 1998

[54] METHOD OF FIELD INSTALLING A PRE-COMBUSTION CHAMBER FOR AN INTERNAL COMBUSTION ENGINE

[76] Inventors: Art Black, 476 Wilcrest, Houston, Tex. 77042; Tom Riggs, 22602 Bobolink Cir., Tomball, Tex. 77375

[21] Appl. No.: 568,507

[22] Filed: Dec. 7, 1995

[51] Int. Cl.[6] ................................................ B23P 15/00
[52] U.S. Cl. ............................ 29/888.011; 29/888.01; 29/401.1
[58] Field of Search .................... 29/888.01, 888.011, 29/401.1, 402.09, 402.03, 428

[56] References Cited

U.S. PATENT DOCUMENTS 4,229,867 10/1980 Spencer .................. 29/888.011

*Primary Examiner*—Irene Cuda
*Attorney, Agent, or Firm*—Carol M. Nielsen; Butler & Binion, L.L.P.

[57] ABSTRACT

A pre-combustion chamber is adapted to be installed in the spark plug well of an existing engine. The spark plug is removed and a centering mandrel is installed in the ln1 spark plug hole. Tools are placed on the mandrel for modifying the walls of the spark plug well to accommodate the pre-combustion chamber assembly. Once the well is modified, the tools and mandrel are removed and the pre-combustion chamber is installed in the well in place of the original spark plug.

7 Claims, 4 Drawing Sheets

METHOD OF FIELD INSTALLING A PRE-COMBUSTION CHAMBER FOR AN INTERNAL COMBUSTION ENGINE

BACKGROUND OF THE INVENTION

1. Field of the Invention

The subject invention generally relates to pre-combustion apparatus for reducing emissions in internal combustion engines, and is specifically directed a method for field installing a self-contained pre-combustion chamber which is adapted to be retrofitted in an existing, in service internal combustion engine.

2. Description of the Prior Art

The use of a pre-chamber in an engine cylinder head is well known. As early as 1876, an Otto engine included an explosion canal in the cylinder head to improve ignition and enhance combustion. The explosion canal was designed to draw in a rich mixture at the very end of the intake stroke, whereby that portion of the charge was exposed to the igniter flame, creating a strong jet of flame which blasted into the combustion chamber for ensuring a quick, positive burning of the total charge. Pre-chamber technology was routinely utilized in high speed racing engines of the 1920's. Cooper-Bessemer incorporated a jet cell in 1938 to achieve charge stratification in the combustion chamber.

The original application of the pre-chamber in gas engines was in the Fairbanks-Morse two-cycle opposed piston engine, used extensively in the electric power generation industry. While the initial interest in pre-combustion chamber technology was to permit use of alternative fuels or to even out the operation of inefficient engines at low speed and low load, this technology has current value because of the emission reduction resulting from the use of pre-combustion systems, even in today's more efficient engines. With the enactment of the Clean Air Act of 1977, conventional engines could no longer meet the emission requirements.

Recently, a number of designs have been tried to improve the emission rating of such engines. One such design is the Cooper CleanBurn design which employs a jet cell igniter installed in the conventional head in place in one of the spark plug wells. The jet cell igniter incorporates a small pre-chamber into which a conventional spark plug is installed and an additional supply of fuel is introduced through a check valve. The timing of the auxiliary fuel supply into the cylinder is accomplished by the differential pressure existing across the check valve. When pressure in the main cylinder and pre-chamber is lower than the fuel supply pressure to the igniter, the check valve will open and fuel will flow into the pre-chamber. When the main chamber and pre-chamber pressure rises to a level higher than the auxiliary fuel supply pressure the check valve will close and block the flow of auxiliary fuel.

More recently, pre-chambers have been incorporated in both four-cycle and two-cycle engines in order to reduce emission levels. While very successful in achieving lower emissions, the cost factor in upgrading to engines including pre-chambers in prohibitive. While many engines are "grandfathered" in, it is becoming more and more difficult to meet emission requirements without use of a pre-chamber.

It is now possible to retro-fit older engines by placing the pre-chamber in one spark plug well. Typically, this requires removing the engine from service and returning a portion of the engine to an off-site facility where extensive modification and repairs are made. While such applications are successful in reducing emissions, cost of shutting down a system during the retrofitting operation often overrides the savings, until such alterations are mandated by regulations. It is, therefore, desirable to develop a pre-combustion chamber which may be replaced in the field without removing the engine from its service location.

SUMMARY OF THE INVENTION

The subject invention is directed to a pre-combustion chamber uniquely designed to installed on existing engines in the field without requiring that the engine first be removed from its service installation. The chamber is designed to be installed in the spark plug well of the engine, and is configured to fit in the well with a minimum of modification to the well, if required at all, making field retrofitting possible.

The preferred embodiment of the invention incorporates an integral design having a lower tip including an external thread adapted to be received in a suitably tapped spark plug hole. A sealing gasket, such as by way of example, a conventional spark plug gasket is placed between the engine head and the chamber. The pre-combustion chamber is inline with the spark plug hole and is double walled to permit external cooling of the chamber. The inner wall defines the pre-combustion chamber. The outer wall is spaced outwardly from the inner wall and forms a jacket surrounding the pre-combustion chamber. The space between the walls defines a cooling jacket of a suitable coolant, such as water, permitting the heat of the pre-combustion chamber to be dissipated. A fuel inlet and fuel delivery system introduces fuel into the pre-combustion chamber in the well-known manner. The spark plug is mounted in direct communication with the pre-combustion chamber. In operation, the spark plug is utilized to ignite the fuel rich/air ratio in the pre-combustion chamber, generating an ignition flame which is released through the lower tip of the pre-combustion chamber to ignite the fuel lean/air ratio in the main combustion chamber.

A unique feature of the pre-combustion chamber of the subject invention is its forgiving design, permitting the chamber assembly to expand and contract during thermal cycling without stress or fatigue fracture. In the preferred embodiment, the cooling jacket shell is an integral member of the assembly. However, one end of the assembly is floating to permit free movement of the chamber wall relative to the jacket wall. Redundant seals are placed between the walls to assure sealing of the cooling jacket.

In the preferred embodiment, resilient O-ring seals are utilized, but other sealing mechanisms may be utilized where desired. Also, the use of redundant seals is not necessary, but incorporation of the redundant architecture greatly increases the reliability of the design.

The pre-combustion chamber design of the subject invention is constructed by welding one end of the cooling jacket body onto the chamber body after the seals have been installed, providing a permanent assembly. The resulting assembly is a rigid, durable design with good thermal cycling characteristics, greatly improving the life of the pre-combustion chamber over that of known designs.

In order to field retrofit an existing engine, the spark plug is first removed from an existing spark plug well of the engine. A centering mandrel is then inserted in the spark plug hole. A series of boring tools or the like are then operated with the mandrel defining the tool axis, in order to modify the well. The tools, mandrel and debris is then removed, leaving an exposed, modified well. The pre-combustion chamber is then inserted in the well.

It is, therefore, an object and feature of the subject invention to provide an improved pre-combustion chamber assembly adapted to be field retrofitted into the spark plug well of an existing internal combustion engine.

It is another object and feature of the subject invention to provide a method of installing a pre-combustion chamber in an existing internal combustion engine without requiring removal of the engine from its field installation.

Other objects and features of the invention will be readily apparent from the drawings and the detailed description of the preferred embodiment.

DETAILED DESCRIPTION OF THE PREFERRED EMBODIMENTS

Figure 1:
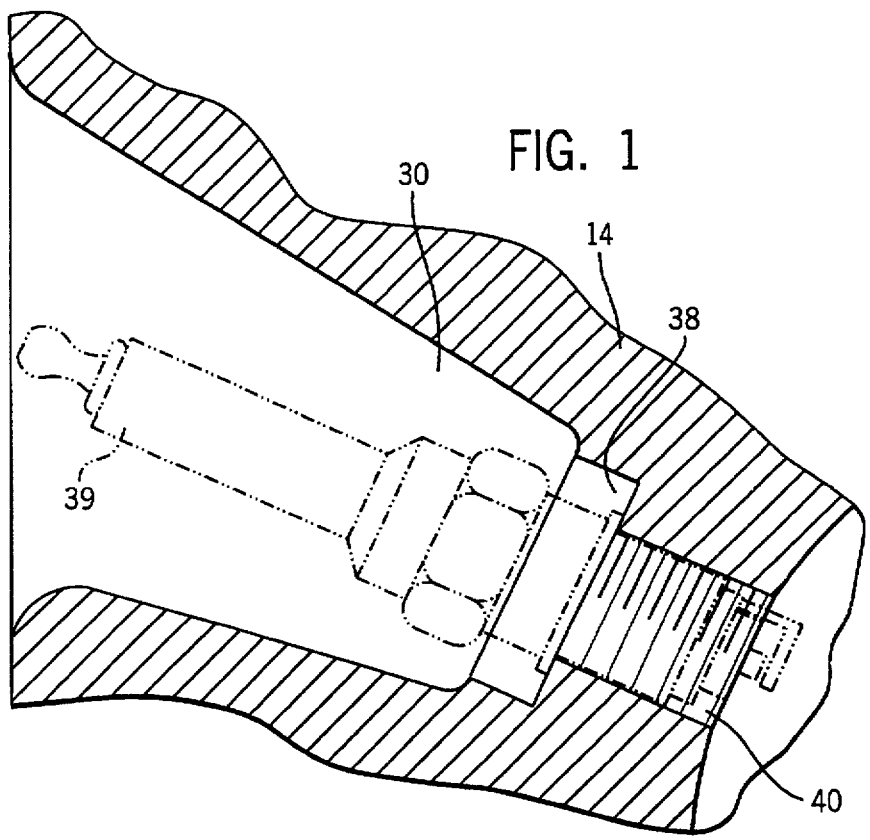
FIG. 1 is a partial cross-section of a typical spark plug well of a prior art internal combustion engine with a spark plug installed therein.

The pre-combustion chamber assembly of the preferred embodiment of the invention is shown and described in our copending application, Ser. No. 567,432, entitled: "PRE-COMBUSTION CHAMBER FOR INTERNAL COMBUSTION ENGINE AND METHOD OF MANUFACTURE THEREOF", filed on even date herewith, incorporated by reference herein. As particularly shown in FIG. 7, the pre-combustion chamber there described includes a body 10 adapted to be installed in a properly modified spark plug well 12 of a standard engine 14. A fuel supply line 16 is connected directly to the chamber assembly, typically through a check-valve 18. The particular check-valve utilized is a matter of choice. However, the preferred check valve is shown and described in our co-pending application, Ser. No. 568,890, entitled: "CHECK VALVE ASSEMBLY", filed on even date herewith, and also incorporated by reference herein. The spark plug 20 is installed directly in the pre-combustion chamber. In operation, a fuel is introduced directly into the pre-combustion chamber through line 16 and check valve 18 and ignited by spark plug 20. The ignited fuel/air mix, then expands and is expelled through a nozzle at the spark plug connector end 22 of the chamber assembly. Typically, a seal or gasket 24 is provided between the outer face of the assembly and the seat surface of the spark plug well.

In the preferred embodiment, the chamber assembly is of integral construction and is defined by a pre-combustion chamber housing member having an interior cavity for defining the combustion chamber. The chamber housing is surrounded by a cooling housing, with a space therebetween for defining a cooling jacket chamber. The nozzle or connector end 22 extends outwardly from the closed bottom of the pre-combustion chamber and is externally threaded to be received in the original spark plug hole 40.

In the preferred embodiment of the invention, the pre-combustion chamber housing assembly is of a unitary construction. The holes, threads and taps are then added, along with finishing the exterior to size. The cooling housing is separately formed, and after final machining of the chamber housing assembly is completed. The cooling housing is welded to the chamber housing.

In the preferred embodiment of the pre-combustion chamber, the lower end 32 of the cooling housing is of reduced diameter to facilitate retrofitting in existing spark plug wells. Using a smaller profile permits less modification of the original spark plug well in order to accommodate the pre-combustion chamber assembly of the invention.

Figure 2:
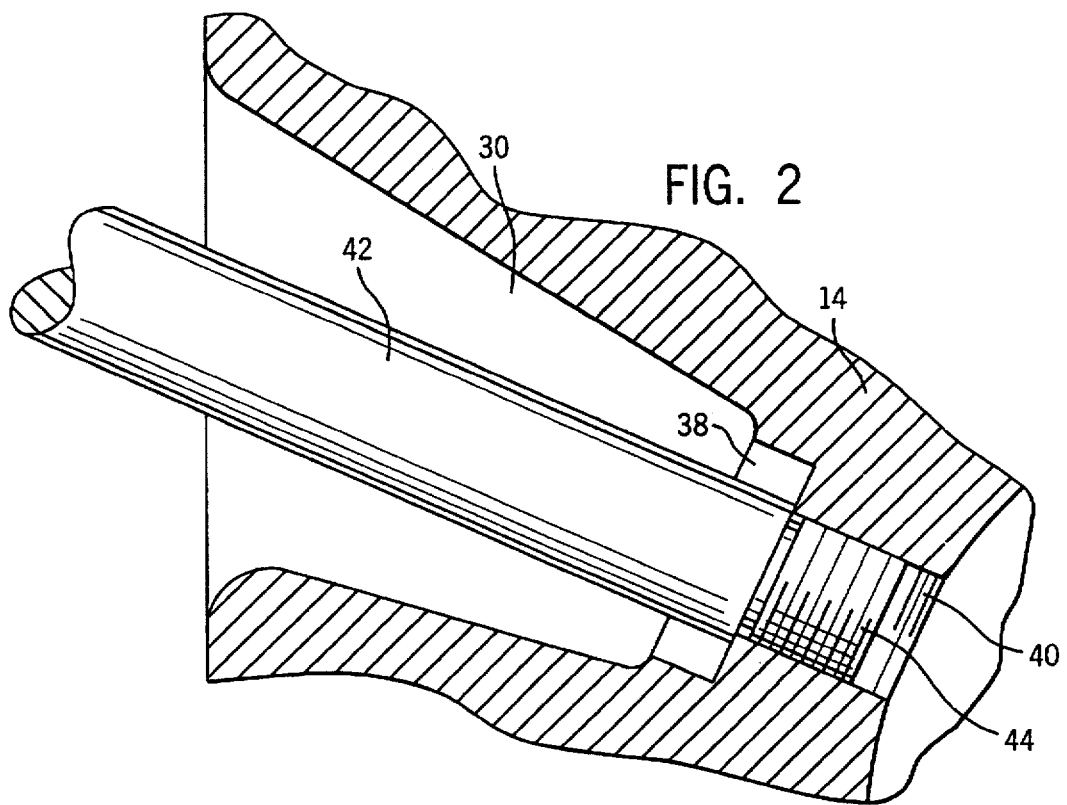
FIG. 2 is a view looking in the same direction as FIG. 1 and showing the spark plug removed and the installation mandrel mounted in the spark plug hole of the well.
Figure 3:
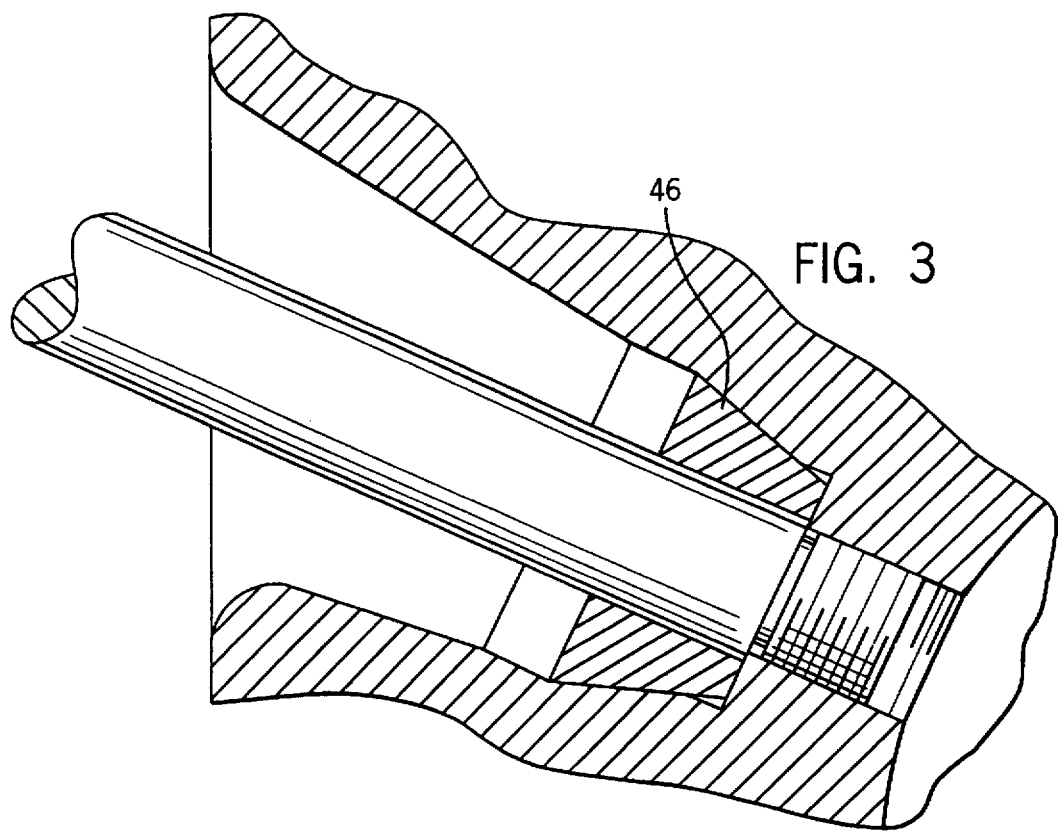
FIG. 3 is a view looking in the same direction as FIG. 2, with the first tool mounted on the mandrel for modifying the spark plug well of the engine.
Figure 4:
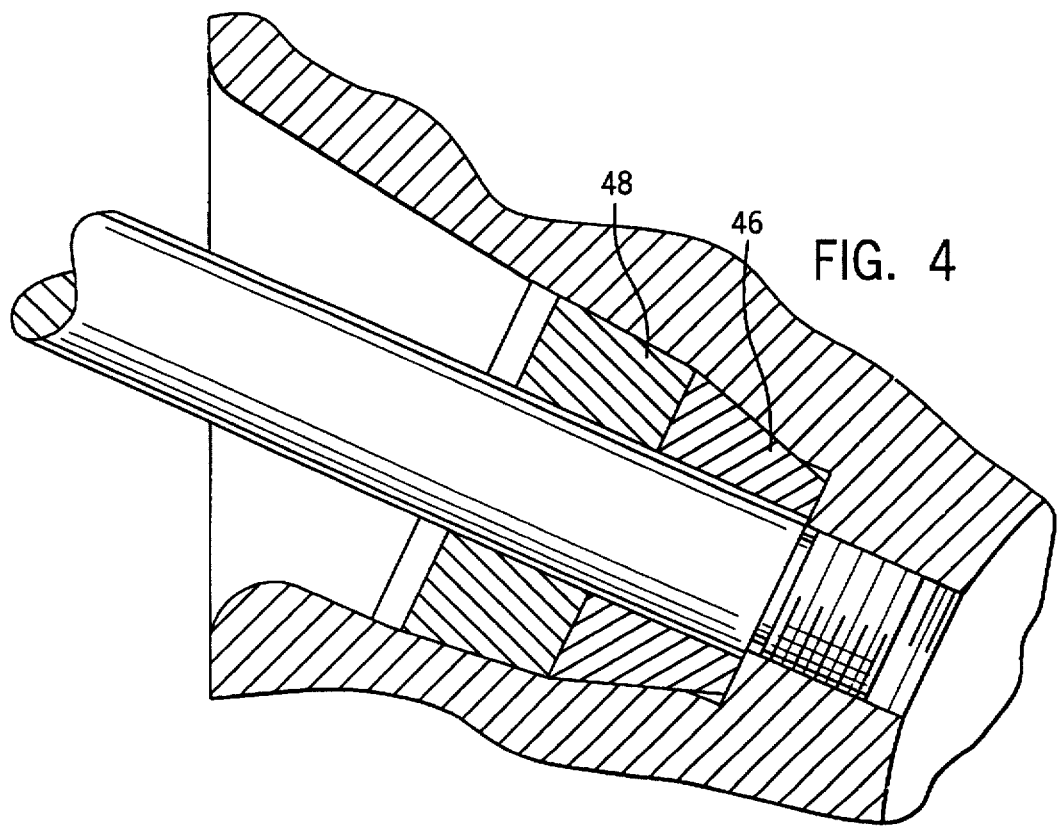
FIGS. 4 and 5 are views similar to FIG. 2, showing additional tools mounted on the mandrel.
Figure 5:
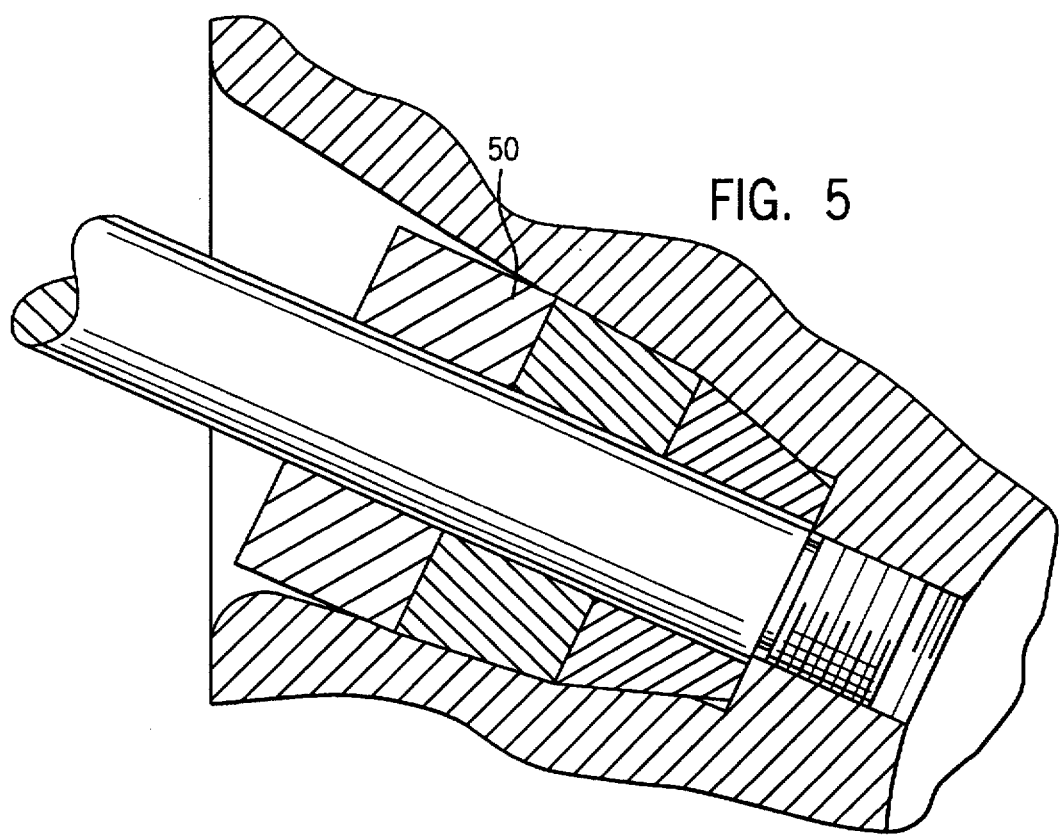
Figure 6:
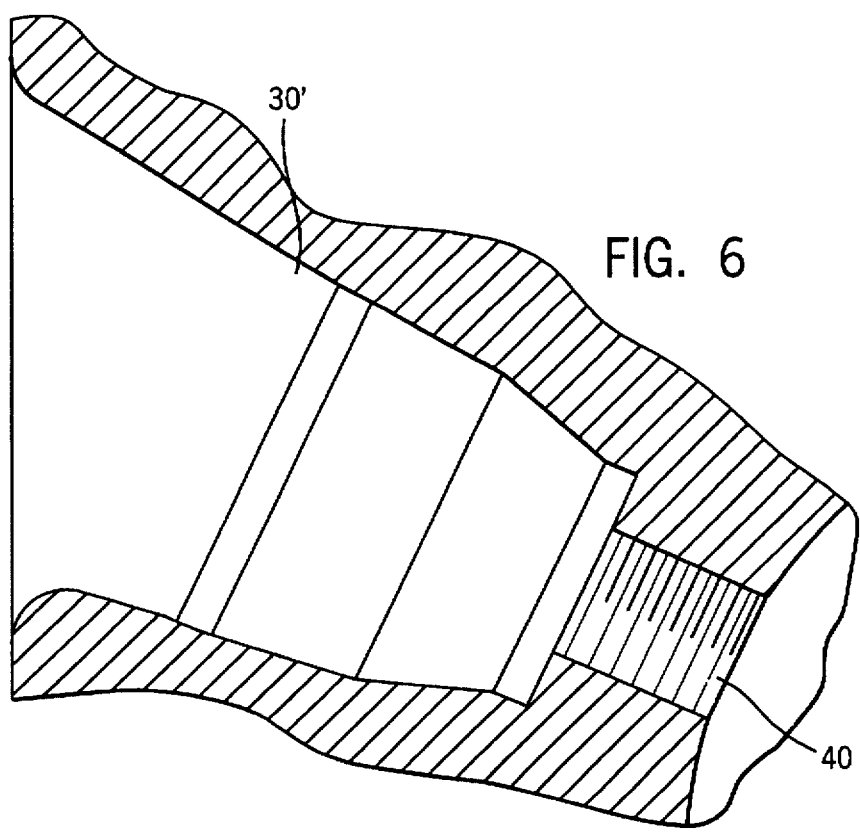
FIG. 6 is a view similar to FIGS. 3–5, showing the modified spark plug well after the tools and mandrel have been removed.
Figure 7:
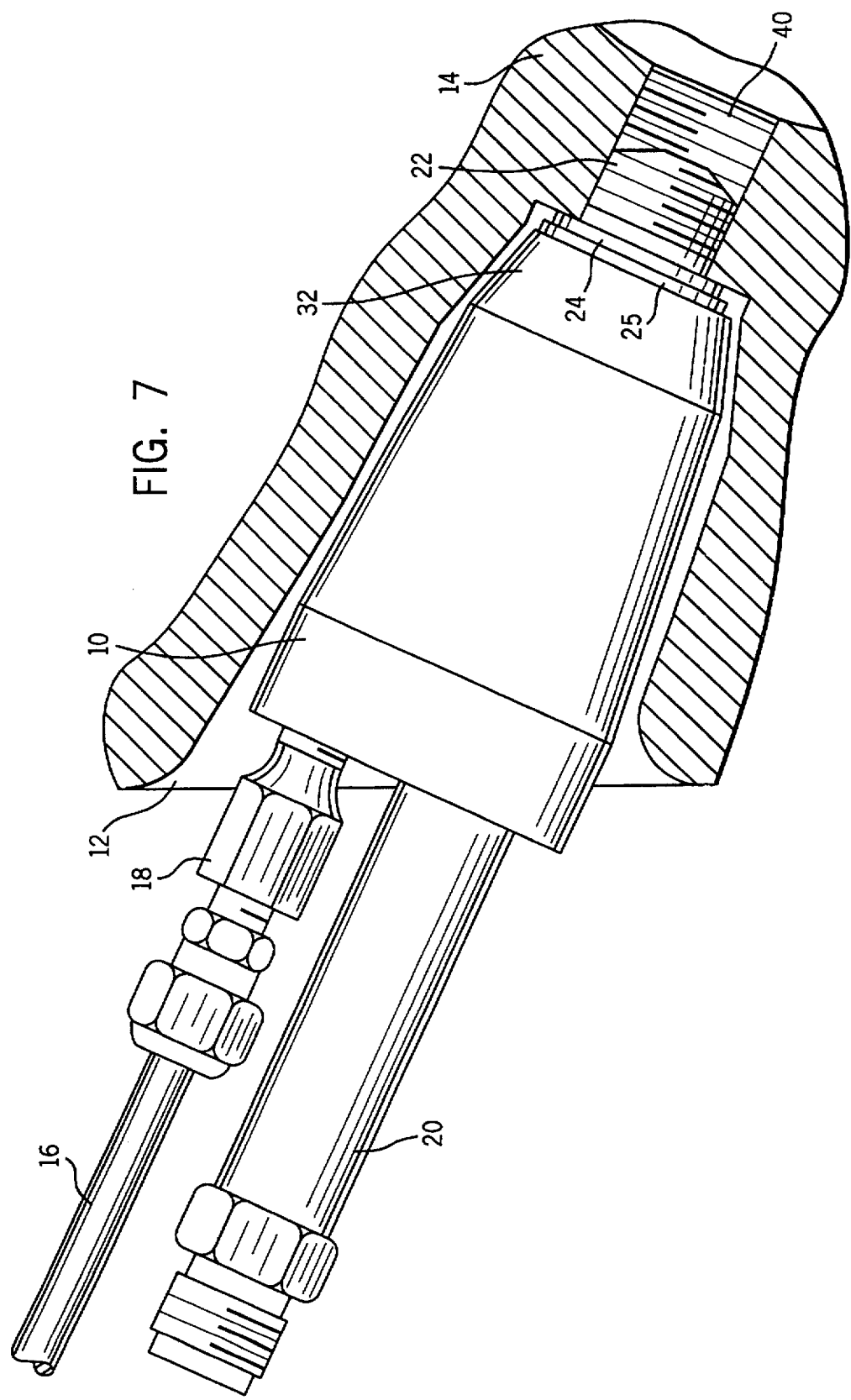
FIG. 7 is a view looking in the same direction as FIG. 6, showing the pre-combustion chamber installed in the modified spark plug well.

The method of the subject invention begins with the prior art internal combustion engine 14, as shown in FIG. 1, with a typical spark plug well 30. As shown, the spark plug well includes a reduced, recessed seat 38 for seating a spark plug 39, shown in phantom. A spark plug hole 40 is suitably internally threaded or tapped for receiving the threaded end of the spark plug 39. In order to accommodate the pre-combustion chamber assembly 10 of the preferred embodiment, it is necessary to modify the clearances in the spark plug well 30. In the preferred method, the spark plug 39 is first removed and a centering mandrel installed in its place as shown in FIG. 2. The centering mandrel is externally threaded at end 44 to be threadably received in the spark plug hole 40. As shown in FIGS. 3, 4 and 5, one or more boring tools 46, 48, and 50 are then operated about the mandrel axis to modify the shape of the spark plug well 30. Once modification is complete, the tools 50, 48 and 46 are removed, debris is removed and the mandrel is withdrawn, leaving a modified spark plug well 30', see FIG. 6. The modified spark plug well 30 is adapted for receiving the contoured body of the pre-combustion chamber 10, as shown in FIG. 7.

Typically, a gasket 24 is placed between the bottom 25 of the pre-combustion chamber and the seating surface 26 of the modified spark plug well. In the preferred method, a standard spark plug gasket is used. The fuel/air delivery line 16 and a spark plug 20 are then installed on the pre-combustion chamber.

While certain embodiments and features of the invention have been described in detail herein, it will be readily understood that the invention incorporates all enhancements and modifications within the scope and spirit of the following claims.

What is claimed is:

1. A method for installing a pre-combustion chamber in a walled spark plug well of an internal combustion engine, comprising the steps of:
   a. inserting a centering mandrel in the spark plug hole of a spark plug well in the engine;
   b. placing a tool on the mandrel for modifying the walls of the spark plug well;
   c. removing the tool from the mandrel after the walls of the spark plug well have been modified;
   d. removing the mandrel;
   e. installing a pre-combustion chamber in the modified spark plug well.

2. The method of claim 1, further comprising sequentially mounting a plurality of tools on the mandrel to provide a contoured walled spark plug well.

3. The method of claim 1, further including the step of removing all debris from the well before the mandrel is removed in step "d".

4. A method of installing a pre-combustion chamber in a walled spark plug well of an internal combustion engine in the field, without removing the engine from its installed location, comprising the steps of:

a. removing the spark plug from a spark plug well;
   b. inserting a centering mandrel in the spark plug hole of a spark plug well in the engine;
   c. placing a tool on the mandrel for modifying the walls of the spark plug well;
   d. removing the tool from the mandrel after the walls of the spark plug well have been modified;
   e. removing the mandrel;
   f. installing a pre-combustion chamber in the modified spark plug well.

5. The method of claim 4, further comprising sequentially mounting a plurality of tools on the mandrel to provide a contoured walled spark plug well.

6. The method of claim 4, further including the step of removing all debris from the well before the mandrel is removed in step "e".

7. The method of claim 4, wherein said tool is a boring tool.

* * * * *